United States Patent
Tsuji

(10) Patent No.: US 9,602,686 B2
(45) Date of Patent: Mar. 21, 2017

(54) DISPLAY DEVICE, IMAGE FORMING APPARATUS, AND DISPLAY CONTROL METHOD

(71) Applicant: KYOCERA Document Solutions Inc., Osaka (JP)

(72) Inventor: Takuya Tsuji, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/467,579

(22) Filed: Aug. 25, 2014

(65) Prior Publication Data
US 2015/0062631 A1 Mar. 5, 2015

(30) Foreign Application Priority Data
Aug. 29, 2013 (JP) .................................. 2013-177896

(51) Int. Cl.
*G06F 3/12* (2006.01)
*H04N 1/00* (2006.01)
(Continued)

(52) U.S. Cl.
CPC ....... *H04N 1/00392* (2013.01); *G06F 3/0483* (2013.01); *G06F 3/0488* (2013.01);
(Continued)

(58) Field of Classification Search
CPC .............................. G06F 3/048; G06F 3/0488
(Continued)

(56) References Cited

U.S. PATENT DOCUMENTS 9,032,324 B2 5/2015 Ohsaki
2009/0161171 A1* 6/2009 Matsumoto ................... 358/461
(Continued)

FOREIGN PATENT DOCUMENTS

JP 2000-242390 A 9/2000
JP 2012-027856 A 2/2012
JP 2013-097549 A 5/2013

OTHER PUBLICATIONS

An Office Action; "Notice of Reasons for Rejection," issued by the Japanese Patent Office on Sep. 29, 2015, which corresponds to Japanese Patent Application No. 2013-177896 and is related to U.S. Appl. No. 14/467,579.
(Continued)

*Primary Examiner* — Marivelisse Santiago Cordero
*Assistant Examiner* — Kevin Ky
(74) *Attorney, Agent, or Firm* — Studebaker & Brackett PC

(57) ABSTRACT

A display device includes a display section having a display surface, a display control section, and a touch panel. The display control section is configured to causes the display section to display a first display region and a first operating region. The touch panel is configured to detect a touch point in touch with the display surface of the display section. A page selected from a plurality of pages is displayed in the first display region. The first operating region has a size corresponding to the number of pages from the page displayed in the first display region to an end page of the pages. The display control section updates the page displayed in the first display region according to the number of to-be-updated pages determined based on a start point to an end point of the touch point within the first operating region.

19 Claims, 8 Drawing Sheets

(51) Int. Cl.
*G06F 3/0483* (2013.01)
*G06F 3/0488* (2013.01)

(52) U.S. Cl.
CPC ..... *H04N 1/00411* (2013.01); *H04N 1/00466* (2013.01); *H04N 1/00469* (2013.01); *H04N 1/00482* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2012/0026522 A1 | 2/2012 | Igawa | |
| 2012/0084702 A1* | 4/2012 | Lee | G06F 3/04883 715/776 |
| 2013/0021281 A1* | 1/2013 | Tse | G06F 3/0425 345/173 |
| 2013/0106809 A1 | 5/2013 | Ohsaki | |
| 2013/0232439 A1* | 9/2013 | Lee | G06F 3/0488 715/776 |
| 2013/0268858 A1* | 10/2013 | Kim et al. | 715/716 |

OTHER PUBLICATIONS

An Office Action; "Notice of Reasons for Rejection," issued by the Japanese Patent Office on Apr. 12, 2016, which corresponds to Japanese Patent Application No. 2013-177896 and is related to U.S. Appl. No. 14/467,579.

* cited by examiner

DISPLAY DEVICE, IMAGE FORMING APPARATUS, AND DISPLAY CONTROL METHOD

INCORPORATION BY REFERENCE

The present application claims priority under 35 U.S.C. §119 to Japanese Patent Application No. 2013-177896, filed Aug. 29, 2013. The contents of this application are incorporated herein by reference in their entirety.

BACKGROUND

The present disclosure relates to display devices, image forming apparatuses, and display control methods for page display.

Graphical user interface (GUI) application programs provide a page turn button on a preview screen. The user touches the button to turn a page.

SUMMARY

A display device according to the first mode of the present disclosure includes a display section having a display surface, a display control section, and a detection section. The display control section is configured to cause the display section to display a first display region and a first operation region. The detection section is configured to detect a touch point in touch with a display surface of the display section. A page selected from a plurality of pages is displayed on the first display region. The first operating region has a size corresponding to the number of pages from the page displayed on the first display region to an end page of the pages. The display control section updates the page displayed on the first display region according to the number of to-be-updated pages determined based on a start point and an end point of the touch point within the first operating region.

An image forming apparatus according to the second mode of the present disclosure includes a display device according to the first mode of the present disclosure and an image forming section. The image forming section is configured to form on a sheet an image of a page selected from the pages.

A display control method according to the third mode of the present disclosure is to cause a display section to display a display region that displays a page selected from a plurality of pages. The method includes: causing the display section to display the display region and an operating region; determining a size of the operating region to be a size corresponding to the number of pages from the page displayed in the display region to an end page of the pages; obtaining information on a touch point in touch with a display surface of the display section; and updating the page displayed in the display region according to the number of to-be-updated pages determined based on a start point and an end point of the touch point within the operating region.

DETAILED DESCRIPTION

Figure 1:
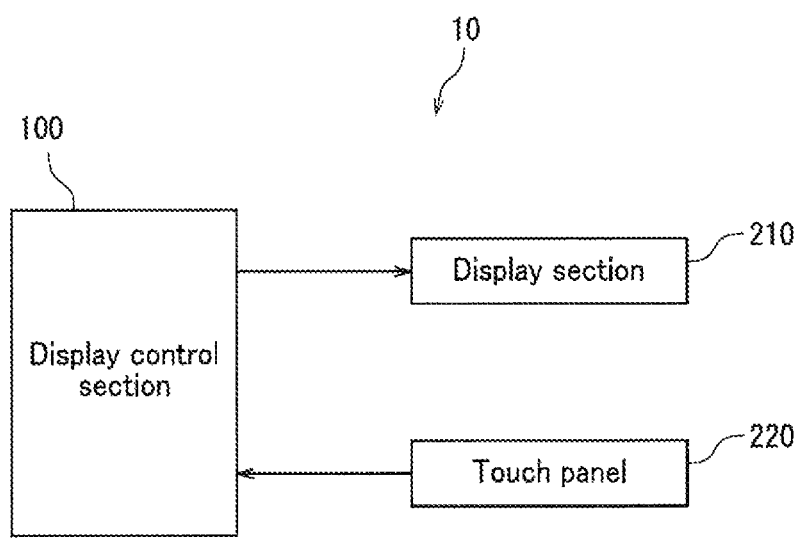
FIG. 1 is a block diagram schematically showing a configuration of a display device according to the first embodiment of the present embodiment.

Embodiments of the present disclosure will be described below with reference to the accompanying drawings. Like numerals denote like elements or corresponding elements in the drawings, and duplicate description shall be omitted.

First Embodiment

Basic Principle

Figure 2A:
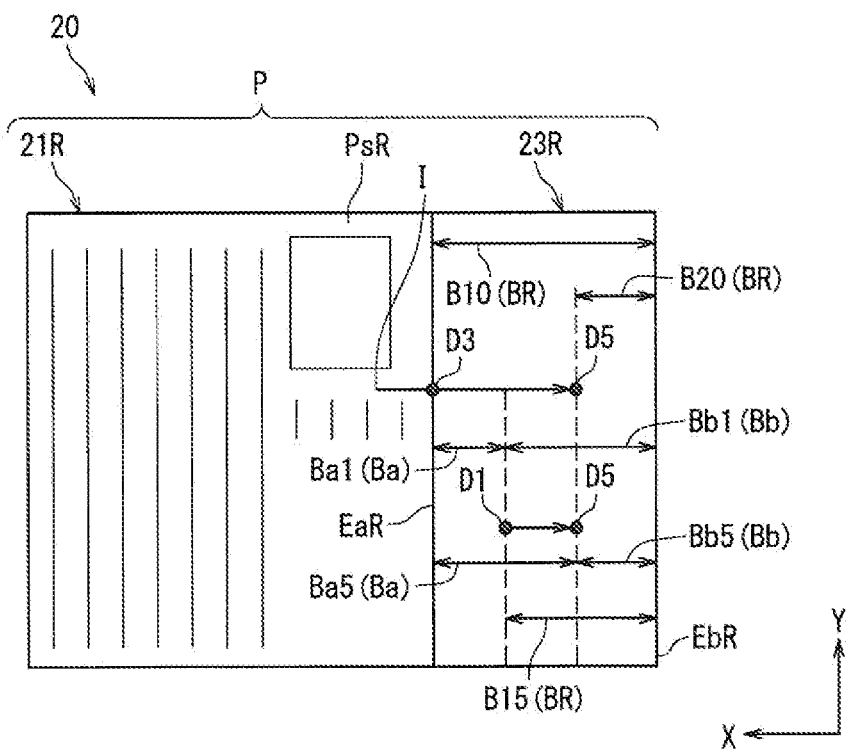
FIGS. 2A and 2B are illustrations for explaining page update control that the display device performs according to the first embodiment of the present disclosure.
Figure 2B:
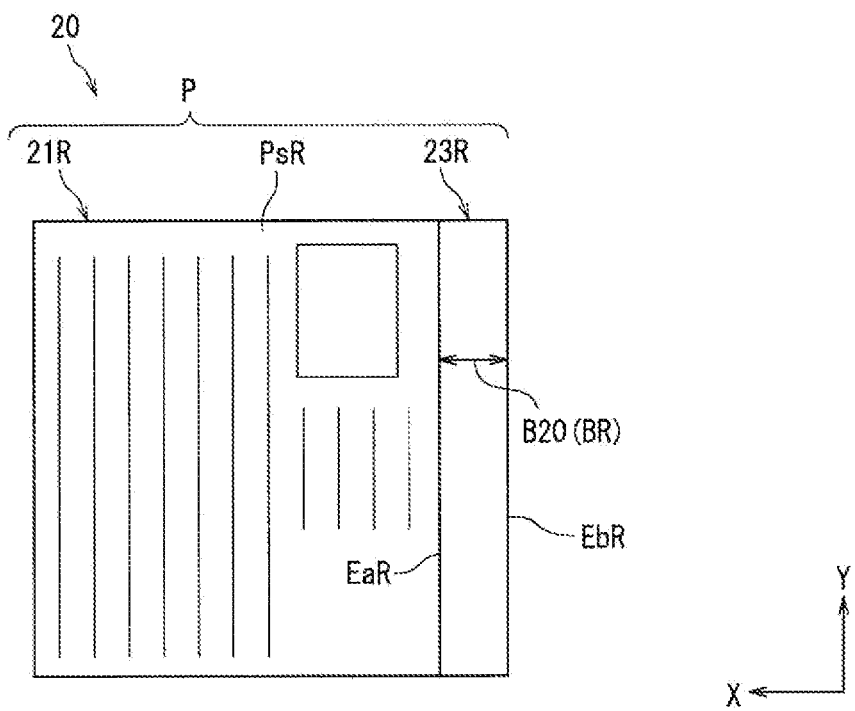

The basic principle of a display device 10 according to the first embodiment of the present disclosure will be described with reference to FIGS. 1, 2A, and 2B. FIG. 1 is a block diagram of the display device 10. FIGS. 2A and 2B are illustrations for explaining page update control that the display device 10 performs. The display device 10 includes a display control section 100, a display section 210 having a display surface, and a touch panel 220 as a detection section.

The display control section 100 causes the display section 210 to display a first display region 21R and a first operating region 23R. The touch panel 220 detects a touch point in touch with the display surface of the display section 210. The first display region 21R displays a page PsR selected from a plurality of pages P of, for example, an eBook or a set of images. The first operating region 23R has a size BR (e.g., size B10, size B15, or size B20) corresponding to the number of pages from the page PsR displayed on the first display region 21R to an end page of the pages P. The display control section 100 updates the page PsR displayed on the first display region 21R according to the number of to-be-updated pages determined based on the start point (e.g., start point D1 or start point D3) and the end point (e.g., end point D5) of the touch point within the first operating region 23R.

The page PsR displayed on the first display region 21R is updated according to the number of to-be-updated pages determined based on the start point and the end point of the touch point within the first operating region 23R in the first embodiment. The first operating region 23R has the size BR corresponding to the number of pages from the page PsR displayed on the first display region 21R to the end page. Accordingly, a user can intuitively specify the number of to-be-updated pages with reference to the size BR of the first operating region 23R as an index. Thus, search for a desired page P can be achieved through a sense of actual page flip.

[Details of Page Update Control on Page PsR]

Page update control will be described in detail with reference to FIGS. 1, 2A, and 2B. An eBook 20 will be exemplified in the first embodiment. In the present specification, a user operates the touch panel 220 with his or her single finger, for example. The touch panel 220 detects the touch point of his/her finger in touch with the display surface of the display section 210. The X axis is in parallel to the long side of the display surface of the display section 210. The Y axis is in parallel to the short side thereof. Hereinafter, the amount of travel of the touch point means an X component of a travel vector of the touch point in the present specification.

The display control section 100 causes the display section 210 to display the eBook 20. The eBook 20 contains a plurality of pages P. A front edge 23R of the eBook 20 is displayed on the first operating region 23R. The size BR of the front edge 23R means its length along the X axis. The front edge 23R has edge lines EaR and EbR in parallel to each other.

An example of a method for determining the number of to-be-updated pages will be described. The display control section 100 determines the number of to-be-updated pages base on the number UA of to-be-updated pages per unit amount of travel of the touch point (hereinafter referred to as a "unit number UA of to-be-updated pages") and the amount of travel of the touch point.

An example of a method for changing the size BR of the front edge 23R will be described. The display control section 100 changes the size BR of the front edge 23R according to a length UB per page of the front edge along the X axis 23R (hereinafter referred to as a "unit length UB") and the number of to-be-updated pages. The unit length UB is a size per unit page of the front edge 23R. The unit length UB is fixed. The unit page may be a single page or plural pages.

An example of a method for determining the size BR of the front edge 23R will be described. Where the edge line EbR of the front edge 23R corresponds to the top page of the eBook 20, the display control section 100 determines the size BR by multiplying the unit length UB by the page number of the page PsR. By contrast, where the edge line EbR of the front edge 23R corresponds to the last page of the eBook 20, the display control section 100 determines the size BR by multiplying the unit length UB by the numerical value obtained by subtracting the page number of the page PsR from the page number of the last page.

An example of a method for specifying a page P corresponding to the touch point will be described. The display control section 100 specifies the page P corresponding to the touch point by calculating the page number of the page P corresponding to the touch point. The display control section 100 calculates the page number of the page P corresponding to the touch point based on a length Ba or a length Bb defined by the touch point. The length Ba is a length along the X axis from the touch point to the edge line EaR of the front edge 23R. The length Bb is a length along the X axis from the touch point to the edge line EbR of the front edge 23R. Accordingly, BR=Ba+Bb is derived. The edge lines EaR and EbR extend along the Y axis to be opposed to each other. The edge line EaR is adjacent to the first display region 21R.

Where the edge line EbR of the front edge 23R corresponds to the last page of the eBook 20, the display control section 100 obtains the page number of the page P corresponding to the touch point in accordance with an expression (page number of last page−page number of page PsR)×(Ba/BR)+(page number of page PsR). In reverse, where the edge line EbR of the front edge 23R corresponds to the top page of the eBook 20, the display control section 100 obtains the page number of the page P corresponding to the touch point in accordance with an expression (page number of page PsR)×(Bb/BR).

A specific example of page flip control will be described below. When the start point D1 of the touch point that the touch panel 220 detects is located within the front edge 23R, the display control section 100 specifies a page P corresponding to the start point D1 based on a length Ba1 (Ba) or a length Bb1 (Bb) defined by the start point D1 that the touch panel 220 detects. Then, the display control section 100 updates the page PsR to the page P corresponding to the start point D1. Further, the display control section 100 changes the size BR of the front edge 23R from the size B10 to the size B15 according to the page number of the page P corresponding to the start point D1.

Next, the display control section 100 consecutively updates the page PsR according to the amount of travel of the touch point from the start point D1 and the unit number UA of to-be-updated pages. Then, the page PsR is updated finally to the page P corresponding to the end point D5. Besides, the display control section 100 seamlessly changes the size BR of the front edge 23R according to the unit length UB and the number of to-be-updated pages in conjunction with the update of the pages P. Then, the size BR of the front edge 23R is changed finally from the size B15 corresponding to the start point D1 to the size B20 corresponding to the end point D5.

Where the start point D3 that the touch panel 220 detects is located on the edge line EaR of the front edge 23R, which means that the length Ba is 0, the page PsR is not updated. Accordingly, the size BR of the front edge 23R remains unchanged. In other words, the size BR of the front edge 23R is maintained as it is (the size B10).

The display control section 100 consecutively updates the page PsR according to the amount of travel of the touch point from the start point D3 and the unit number UA of to-be-updated pages. Then, finally, the page PsR is updated to the page P corresponding to the end point D5. Besides, the display control section 100 seamlessly changes the size BR of the front edge 23R according to the unit length UB and the number of to-be-updated pages in conjunction with the update of the page PsR. Then, the size BR of the front edge 23R is changed finally from the size B10 corresponding to the start point D3 to the size B20 corresponding to the end point D5.

The display control section 100 in the first embodiment executes update control on the page PsR and size change control on the size BR in response to detection of the touch point within the front edge 21R. For example, as shown in FIG. 2A, a start point I of the touch point present in the first display region 21R on the screen serves also as the start point D3 of the touch point in the front edge 23R. Accordingly, the display control section 100 executes neither update control on the page PsR nor size change on the size BR until the touch point reaches the start point D3.

[Specific Example of Page Update on Page PsR]

A specific example of page update on the page PsR will be described next with reference to FIGS. 2A and 2B. The present specific example assumes that: the edge line EbR of the front edge 23R corresponds to the last page of the eBook 20; the unit length UB of the front edge 23R is 5/9 dots; the page number of the last page is 1000; and the page number of the page PsR being displayed in the first display region 21R is 100. The page number of the page PsR being 100 means therefore that the size B10 of the front edge 23R corresponds to 500 dots.

Where the length Ba1 from the edge line EaR to the start point D1 corresponds to 100 dots, and the length Bb1 from the start point D1 to the edge line EbR corresponds to 400 dots, the page number of the page P corresponding to the start point D1 is 280 (=1000−100)×(100/500)+100).

Where a length Ba5 from the edge line EaR to the end point D5 corresponds to 300 dots, and a length Bb5 from the end point D5 to the edge line EbR corresponds to 200 dots, the page number of the page P corresponding to the end point D5 is 640 (=1000−100)×(300/500)+100).

The display control section 100 updates the page PsR to the 280th page P corresponding to the start point D1. Then, the display control section 100 consecutively updates the page PsR from the 280th page corresponding to the start point D1 to the 640th page corresponding to the end point D5.

Further, the display control section 100 seamlessly changes the size BR of the front edge 23R from the size B15 (400 dots) corresponding to the start point D1 to the size B20 (200 dots) corresponding to the end point D5.

Display Control Method

Figure 3:
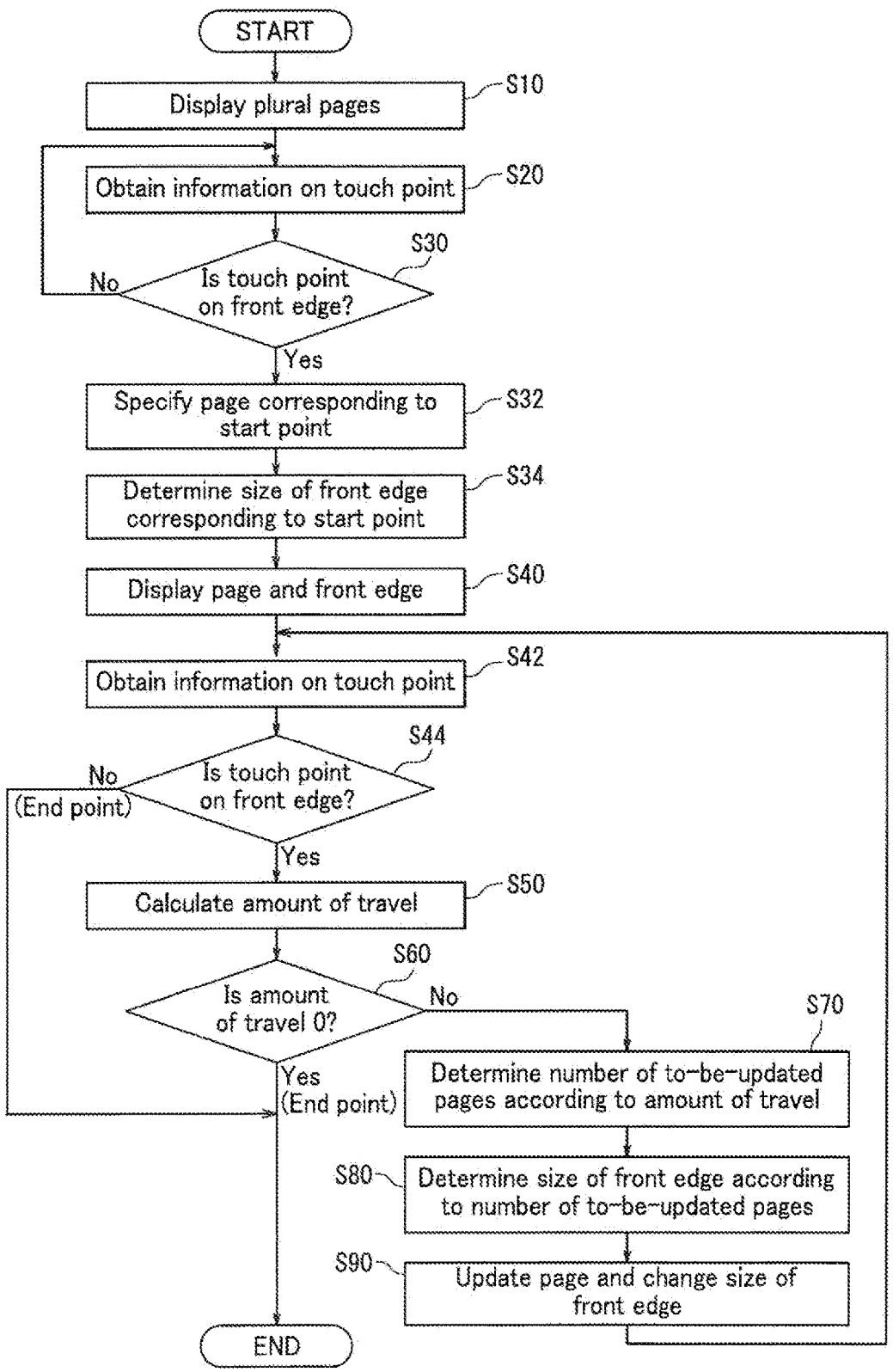
FIG. 3 is a flowchart depicting a display control method that the display device performs according to the first embodiment of the present disclosure.

With reference to FIGS. 1-3, a display control method will be described which the display device 10 performs. FIG. 3 is a flowchart depicting the display control method. In accordance with the display control method, the display section 210 displays the first display region 21R where the page PsR selected from the pages P is to be displayed. Through Steps S10-S90 in the display control method, the page PsR displayed on the first display region 21R is updated according to the number of to-be-updated pages determined based on the start point and the end point of the touch point within the front edge 23R. A specific procedure is as follows.

At Step S10, the display control section 100 causes the display section 210 to display the pages P (eBook 20). Specifically, the display control section 100 causes the display section 210 to display the first display region 21R and the front edge 23R. At Step S20, the display control section 100 obtains through the touch panel 220 information on the touch point in touch with the display surface of the display section 210.

At Step S30, the display control section 100 determines whether or not the touch point is on the front edge 23R. When a negative determination is made (No) at Step S30, the routine returns to S20. When a positive determination is made (Yes) at Step S30, the routine proceeds to S32.

At Step S32, the display control section 100 specifies the page P corresponding to the start point of the touch point as the page PsR to be displayed on the first display region 21R. At Step S34, the display control section 100 determines the size BR of the front edge 23R corresponding to the start point of the touch point. Specifically, the display control section 100 determines the size BR of the front edge 23R as a size corresponding to the number of pages from the page PsR displayed on the first display region 21R to one end page of the pages P. At Step S40, the display control section 100 causes the display section 210 to display the page PsR specified at Step S32 and the front edge 23R of the size BR determined at Step S34.

At Step S42, the display control section 100 obtains through the touch panel 220 information on the touch point in touch with the display surface of the display section 210. At Step S44, the display control section 100 determines whether or not the touch point is on the front edge 23R.

When a positive determination is made (Yes) at Step S44, the routine proceeds to Step S50. At Step S50, the display control section 100 calculates the amount of travel of the touch point. At Step S60, the display control section 100 determines whether or not the amount of travel of the touch point is 0.

When a negative determination is made (No) in Step S60, the routine proceeds to Step S70. At Step S70, the display control section 100 determines the number of to-be-updated pages according to the amount of travel of the touch point and the unit number UA of to-be-updated pages. At Step S80, the display control section 100 determines the size BR of the front edge 23R according to the number of to-be-updated pages and the unit length UB. As a result, the size BR of the front edge 23R is determined as a size corresponding the number of pages from the page PsR displayed on the first display region 21R to the end page of the pages P. At Step S90, the display control section 100 updates the page PsR according to the number of to-be-updated pages determined at Step S70 and changes the size of the front edge 23R according to the size BR determined at Step S80. Then, the routine returns to Step S42.

When a negative determination is made (No) at Step S44, or a positive determination is made (Yes) at Step S60, the routine is ended because the touch point serves as the end point at the determination.

As has been discussed so far with reference to FIGS. 1-3, the page PsR is updated according to the number of to-be-updated pages determined based on the start point and the end point of the touch point on the front edge 23R (i.e., within the front edge 23R) in the present embodiment. Besides, the front edge 23R has the size BR corresponding to the number of pages from the page PsR to one of the end pages of the eBook 20. Accordingly, the user can intuitionally specify the number of to-be-updated pages with reference to the size BR of the front edge 23R as an index. As a result, a desired page P can be searched through a sense of actual page flip.

Further, in the first embodiment, the display control section 100 changes the size BR of the front edge 23R in conjunction with update of the page PsR displayed on the first display region 21R. Accordingly, the user can visually check the process of sequential update of the content of the page PsR and the process of continuous change in the size BR of the front edge 23R. Accordingly, the user can search for a desired page P through a sense of actual page flip.

Second Embodiment

Main Part

Figure 4A:
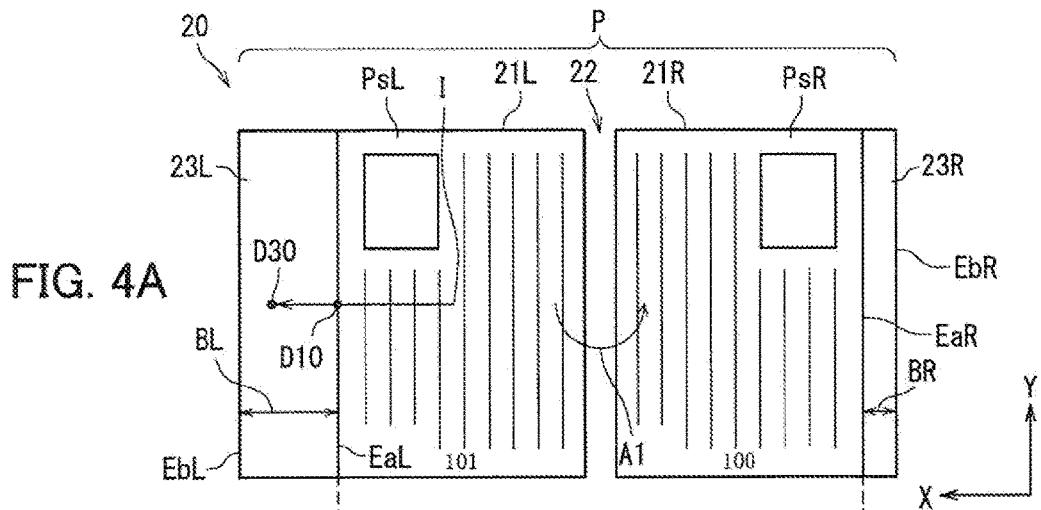
FIGS. 4A-4C are illustrations for explaining page update control that the display device performs according to the second embodiment of the present disclosure.
Figure 4B:
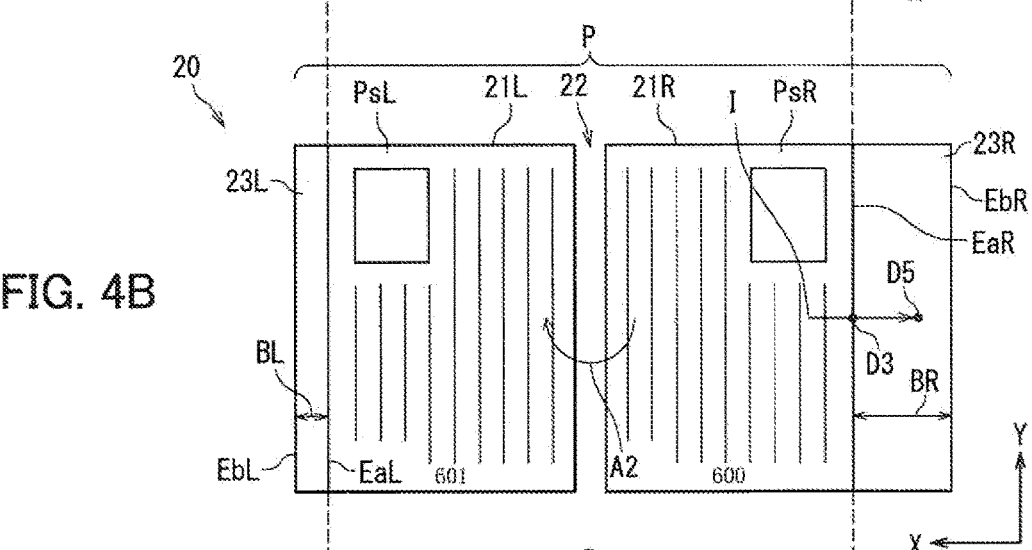
Figure 4C:
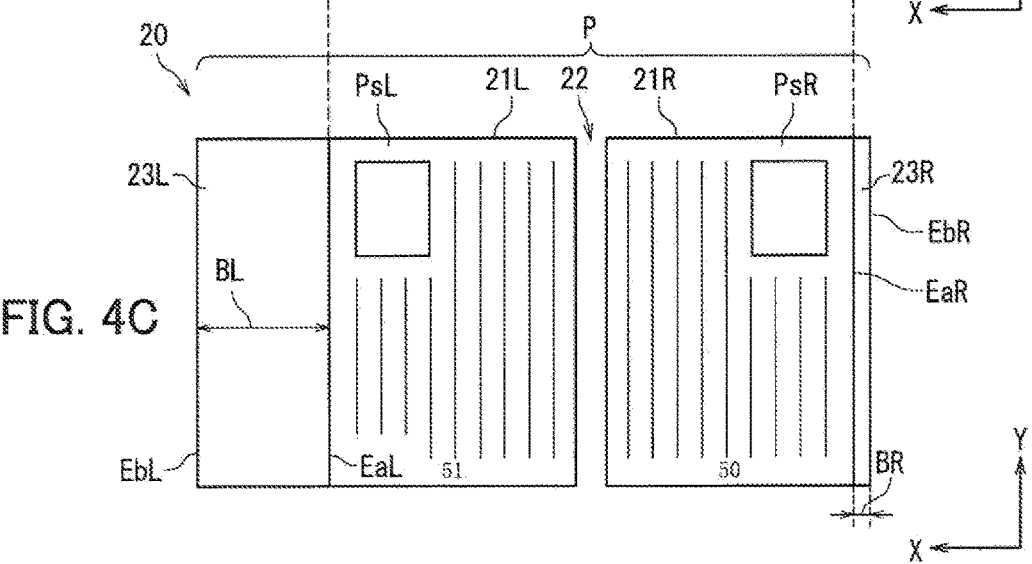

The main part of the display device 10 according to the second embodiment of the present disclosure will be described with reference to FIGS. 1 and 4C. FIGS. 4A-4C are illustrations showing page update control that the display device 10 performs. The configuration of the display device 10 according to the second embodiment is the same as that of the display section 10 shown in FIG. 1.

The display control section 100 causes the display section 210 to display the first display region 21R, the first operating region 23R, a second display region 21L, and a second operating region 23L. The first and second display regions 21R and 21L are arranged side by side between the first and second operating regions 23R and 23L. A page PsR selected from a plurality of pages P of, for example, an eBook or a set of images is displayed on the first display region 21R. A page PsL subsequent to the page PsR displayed on the first display region 21R is displayed on the second display region 21L.

The first operating region 23R has a size BR corresponding to the number of pages from the page PsR displayed on the first display region 21R to the top page of the pages P. The second operating region 23L has a size BL corresponding to the number of pages from the page PsL displayed on the second display region 21L to the last page of the pages P.

The display control region 100 updates the page PsR displayed on the first display region 21R and the page PsL displayed on the second display region 21L according to the number of to-be-updated pages determined based on the start point (e.g., the start point D10 in FIG. 4A or the start point D3 in FIG. 4B) and the end point (e.g., the end point D30 in FIG. 4A or the end point D5 in FIG. 4B) of the touch point within the first or second operating region 23R or 23L.

According to the second embodiment, displaying the first and second display regions 21R and 21L and the first and second operating regions 23R and 23L can result in display of the pages PsR and PsL in a two-page spread format. Further, the user can intuitionally specify the number of to-be-updated pages with reference to the size BR of the first operating region 23R and the size BL of the second operating region 23L as indices. This can allow the user to search for a desired page P through a sense of actual page flip.

[Details of Page Update Control on Pages PsR and PsL]

Page update control on the pages PsR and PsL will be described in detail with reference to FIGS. 1 and 4A-4C. The eBook 20 will be discussed below as one example.

The display control section 100 causes the display section 210 to display the eBook 20. The eBook 20 contains a plurality of pages P. A part of the front edge of the eBook 20 (hereinafter referred to as a front edge part 23R) is displayed on the first operating region 23R. The other part of the front edge of the eBook 20 (hereinafter referred to as a front edge part 23L) is displayed on the second operating region 23L. The front edge parts 23R and 23L have sizes BR and BL with lengths along the X axis in the front edge parts 23R and 23L, respectively. A sum B of the sizes BR and BL is fixed. Further, a gorge 22 is displayed between the first and second display regions 21R and 21L. The gorge 22 is a band-like region extending along the Y axis.

The front edge part 23R has edge lines EaR and EbR extending along the Y axis. The edge line EbR corresponds to the top page of the eBook 20. The front edge part 23L has edge lines EaL and EbL extending along the Y axis. The edge line EbL corresponds to the last page of the eBook 20.

The method for determining the number of to-be-updated pages, the method for changing the size BR (and the size BL), the method for determining the size BR (and the size BL), and the method for specifying the page P corresponding to the touch point in the second embodiment are the same as those in the first embodiment described with reference to FIGS. 2A and 2B.

It should be noted that the unit length UB in the front edge part 23R or 23L is a length along the X axis per page, that is, the size per unit page in the front edge part 23R or 23L. The unit length UB is fixed.

The length Ba is a length from the touch point to the edge line EaR (or EaL) of the front edge part 23R (or 23L). A length Bb is a length from the touch point to the edge EbR (or EbL) of the front edge part 23R (or 23L).

Further, determination of one of a pair of the page PsR and the size BR and a pair of the page PsL and the size BL necessarily determines the other pair. This is because the total number of pages P and the sum B of the sizes BR and BL are fixed.

A specific example will now be discussed below. As shown in FIG. 4A, when the touch point (the start point D10) on the front edge part 23L is detected through the touch panel 220, the display control section 100 flips a pages P in the direction indicated by the arrow A1 and changes each sizes BR and BL of the front edge parts 23R and 23L in conjunction with the flip of the page P. In other words, the display control section 100 changes each of the size BR of the front edge part 23R and the size BL of the front edge part 23L according to the update of the pages PsR and PsL displayed on the first and second display regions 21R and 21L, respectively. For example, when the touch point travels from the start point D10 to the end point D30 on the front edge part 23L, the eBook 20 in a state shown in FIG. 4B is displayed in the end.

Specifically, the display control section 100 determines the number of to-be-updated pages according to the unit number UA of to-be-updated pages and the amount of travel of the touch point, and then updates the page PsL. The display control section 100 also updates the page PsR to a page P subsequent to the page PsL. Further, the display control section 100 changes the size BL of the front edge part 23L according to the unit length UB and the number of to-be-updated pages. The display control section 100 also changes the size BR of the front edge part 23R in conjunction with the change in the size BL of the front edge part 23L. The size BR can be calculated by, for example, subtracting the size BL from the sum B of the sizes BR and BL.

As shown in FIG. 4B, when the touch point (start point D3) on the front edge part 23R is detected through the touch panel 220, the display control section 100 flips a page P in the direction indicated by the arrow A2 and changes the size BL of the front edge part 23L and the size BR of the front edge part 23R in conjunction with the flip of the page P. For example, when the touch point travels from the start point D3 to the end point D5 on the front edge part 23R, the eBook 20 in a state shown in FIG. 4C is displayed in the end.

Specifically, the display control section 100 determines the number of to-be-updated pages according to the unit number UA of to-be-updated pages and the amount of travel of the touch point, and then updates the page PsR. The display control section 100 also updates the page PsL to a page P subsequent to the page PsR and changes the size BR of the front edge part 23R according to the unit length UB and the number of the to-be-updated pages. Further, the display control section 100 changes the size BL of the front edge part 23L correspondingly to the change in the size BR of the front edge part 23R. The size BL can be calculated by, for example, subtracting the size BR from the sum B.

FIGS. 4A-4C show the case where the start point 10D (or D3) of the touch point is located on the edge line EaL (or EaR). However, even when the start point of the touch point is located within either of the front edge parts 23L or 23R, the pages PsR and PsL are updated, and the sizes BR and BL are changed in the similar manner to that in the case where the start point of the touch point is located on either of the edge lines EaL or EaR. In this case, the display control section 100 calculates the page number of the page P corresponding to the start point of the touch point in the similar manner to that in the first embodiment described with reference to FIGS. 2A and 2B, thereby resulting in specification of the page P corresponding to the start point of the touch point and determination of the sizes BR and BL.

In the second embodiment, when the touch panel 220 detects the touch point in a region other than the front edge parts 23R and 23L (e.g., the first or second display region 21R or 21L), the display control section 100 neither updates the pages PsR and PsL nor changes each size BR and BL of the front edge parts 23R and 23L.

[Arrangement of eBook 20]

Figure 5:
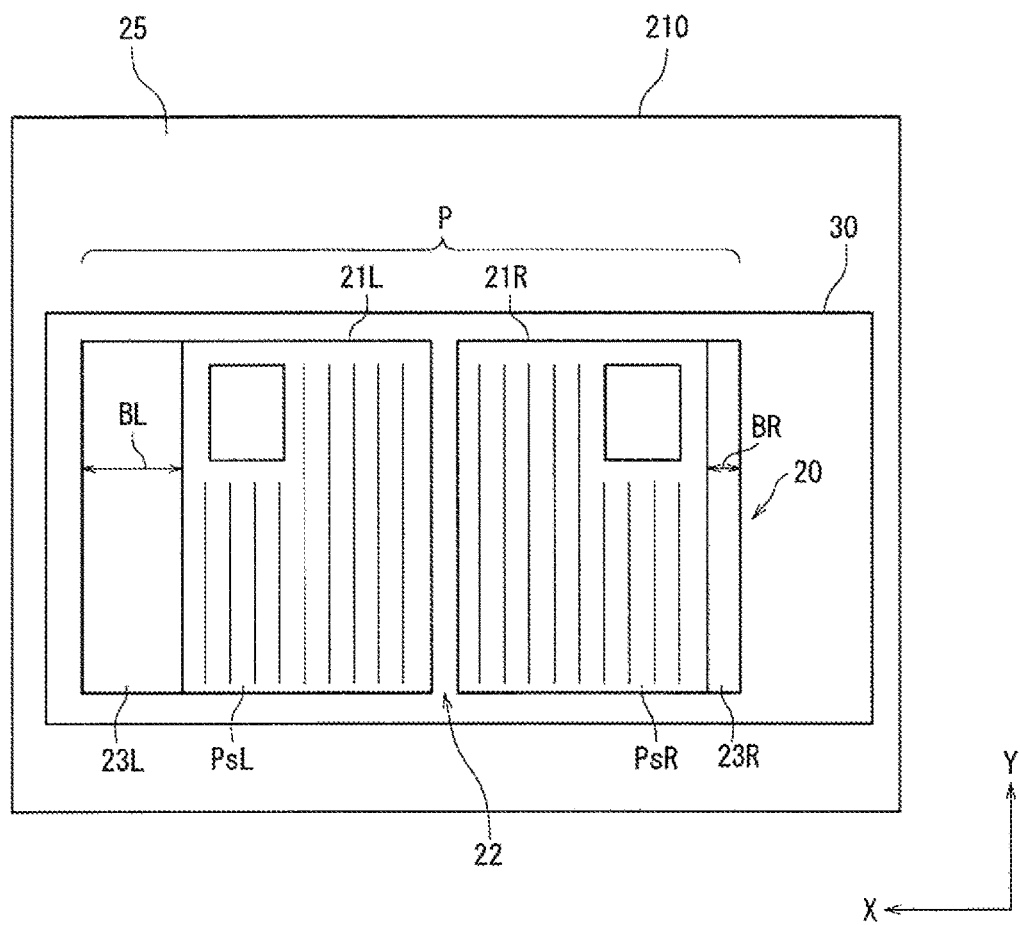
FIG. 5 is an illustration showing a screen of the display device according to the second embodiment of the present embodiment.

The arrangement of the eBook 20 will be described with reference to FIGS. 1 and 5. FIG. 5 is an illustration showing the screen 25 of the display section 210. The display control section 100 controls the arrangement of the eBook 20 displayed on the screen 25. A specific procedure is as follows.

The display section 210 includes the screen 25. The screen 25 is provided with a preview area 30. The position of the preview area 30 in the screen 25 is fixed. The eBook 20 is displayed in a two-page spread format in the preview area 30.

Each size (length along X axis and length along Y axis) and each position of the first and second display regions 21R and 21L are fixed in the preview area 30 regardless of update of the pages PsL and PsR. Accordingly, the size and the position of the gutter 22 are fixed in the preview area 30.

By contrast, each size BR and BL of the front edge parts 23R and 23L is changed according to update of the pages PsL and PsR, while the sum B of the sizes BR and BL is fixed.

As has been described with reference to FIGS. 1 and 5, even when the size BR of the front edge part 23R and the size BL of the front edge part 23L are changed in conjunction with update of the pages PsR and PsL, each size and each position of the first and second display regions 21R and region 21L are fixed on the screen 25. Thus, the visibility of the pages PsR and PsL can be enhanced.

[Upper Limits of Front Edges 23R and 23L]

With reference to FIGS. 4A and 5, description will be made about upper limits of the size BR of the front edge pert 23R and the size BL of the front edge part 23L. The unit length UB (length along the X axis per page in each front edge part 23R and 23L) is fixed. Accordingly, the larger the number of the pages P is, the larger the sizes BR and BL is. However, the size of the preview area 30 is fixed. Accordingly, where the total number of pages of an eBook is large, the first and second display regions 21R and 21L needs to be scaled down in order to display the entire front edge parts 23L and 23R. This may impair the visibility.

In view of the foregoing, the upper limits of the size BR of the front edge pert 23R and the size BL of the front edge part 23L are set in order to keep the sizes of the first and second display regions 21R and 21L fixed. This can prevent the visibility from being impaired.

Where the number of the pages P contained in the front edge part 23R (or 23L) exceeds the number of pages corresponding to the upper limit of the size BR (or BL), when the touch point travels from the edge line EaR (or EaL) to the edge line EbR (or EbL), the display control section 100 updates only pages P of which the number corresponds to the upper limit. Accordingly, repetition of the travel of the touch point from the edge line EaR (or EaL) to the edge line EbR (or EbL) can result in display of a page P of which the page number exceeds the number of pages corresponding to the upper limit.

Display Control Method

Figure 6:
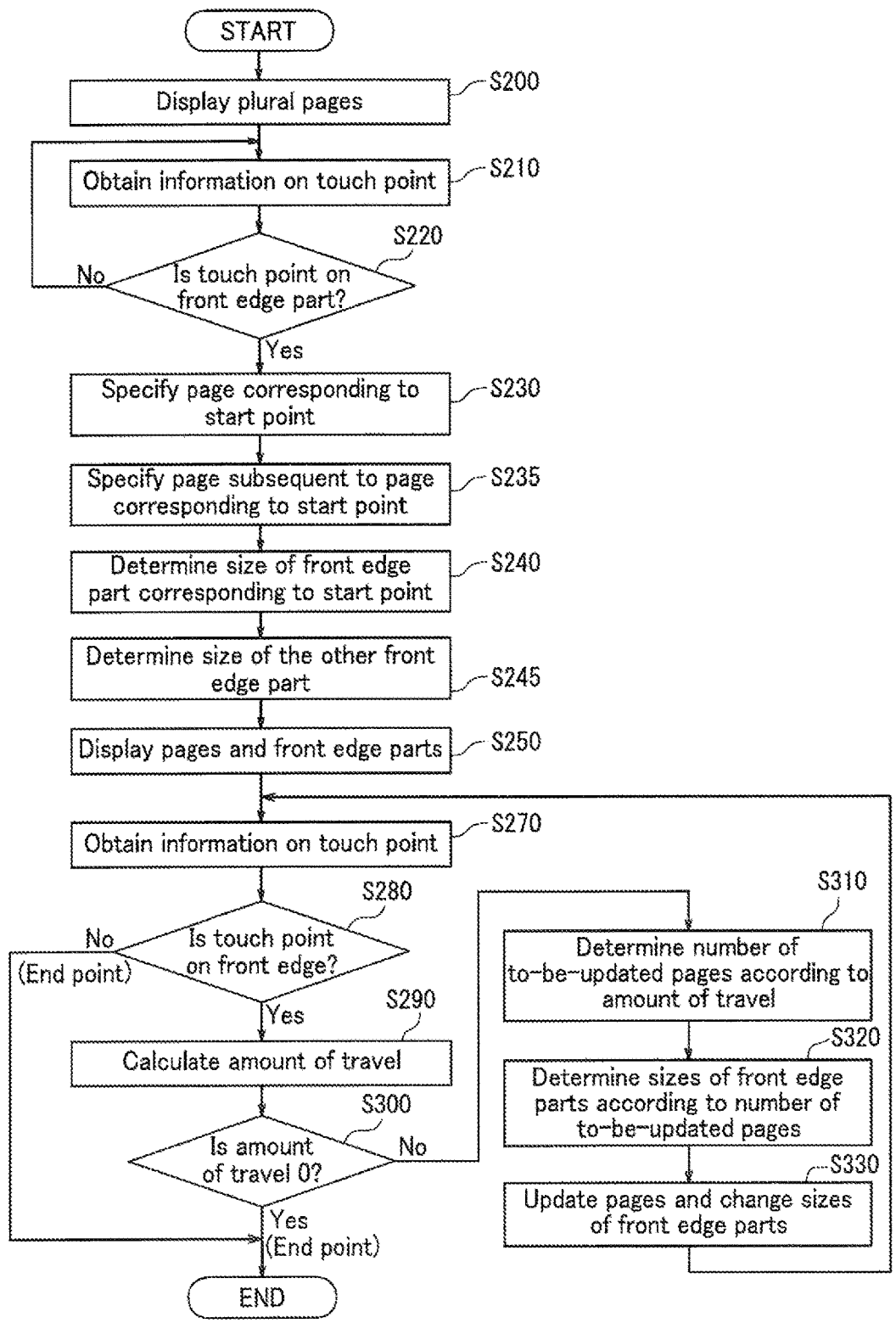
FIG. 6 is a flowchart depicting a display control method that the display device performs according to the second embodiment of the present disclosure.

With reference to FIGS. 1, 4A-4C, and 6, a display control method will be described that the display device 100 performs. FIG. 6 is a flowchart depicting the display control method.

At Step S200, the display control section 100 causes the display section 210 to display a plurality of pages P (the eBook 20). At Step S210, the display control section 100 obtains information on the touch point in touch with the display surface of the display section 210 through the touch panel 220.

At Step S220, the display control section 100 determines whether or not the touch point is on the front edge part 23R or the front edge part 23L. When a negative determination is made (No) in S220, the routine returns to Step S210. When a positive determination is made (Yes) at Step S220, the routine proceeds to Step S230. The case where the touch point on the front edge part 23R is detected will be described below.

At Step S230, the display control section 100 specifies the page P corresponding to the start point of the touch point as the page PsR to be displayed in the first display region 21R. At Step S235, the display control section 100 specifies a page P subsequent to the page P corresponding to the start point of the touch point as a page PsL to be displayed in the second display region 21L.

At Step S240, the display control section 100 determines the size BR of the front edge part 23R corresponding to the start point of the touch point. At Step S245, the display control section 100 determines the size BL of the front edge part 23L according to the determined size BR of the front edge part 23R. At Step S250, the display control section 100 causes the display section 210 to display the page PsR specified at Step S230, the page PsL specified at Step S235, the front edge part 23R of the size BR determined at Step S240, and the front edge part 23L of the size BL determined at Step S245.

At Step S270, the display control section 100 obtains information on the touch point in touch with the display surface of the display section 210 through the touch panel 220. At Step S280, the display control section 100 determines whether or not the touch point is on the front edge part 23R or 23L. When a positive determination is made (Yes) at Step S280, the routine proceeds to Step S290. At Step S290, the display control section 100 calculates the amount of travel of the touch point. At Step S300, the display control section 100 determines whether or not the amount of travel of the touch point is 0.

When a negative determination is made (No) in Step S300, the routine proceeds to S310. At Step S310, the display control section 100 determines the number of to-be-updated pages according to the amount of travel of the touch point and the unit number UA of to-be-updated pages. At Step S320, the display control section 100 determines each size BR and BL of the front edge parts 23R and 23L according to the number of to-be-updated pages and the unit length UB. At Step S330, the display control section 100 updates the pages PsR and PsL and change each size BR and BL of the front edges 23R and 23L on the display section 210 according to the number of the to-be-updated pages determined at Step S310 and the sizes BR and BL determined at Step S320. Then, the routine returns to Step S270.

When a negative determination is made (No) at Step S280, or a positive determination is made (Yes) at Step S300, the routine is ended because the touch point serves as the end point at the determination.

As has been described with reference to FIGS. 1 and 4A-6, the pages PsR and PsL can be displayed in a two-page spread format in the second embodiment. Moreover, the user can intuitively specify the number of to-be-updated pages with reference to the size BR of the front edge part 23R and the size BL of the front edge part 23L as indices. This can allow the user to search for a desired page P through a sense of actual page flip. Besides, the second embodiment can achieve the same advantages as those in the first embodiment.

Third Embodiment

Image Forming Apparatus

Figure 7:
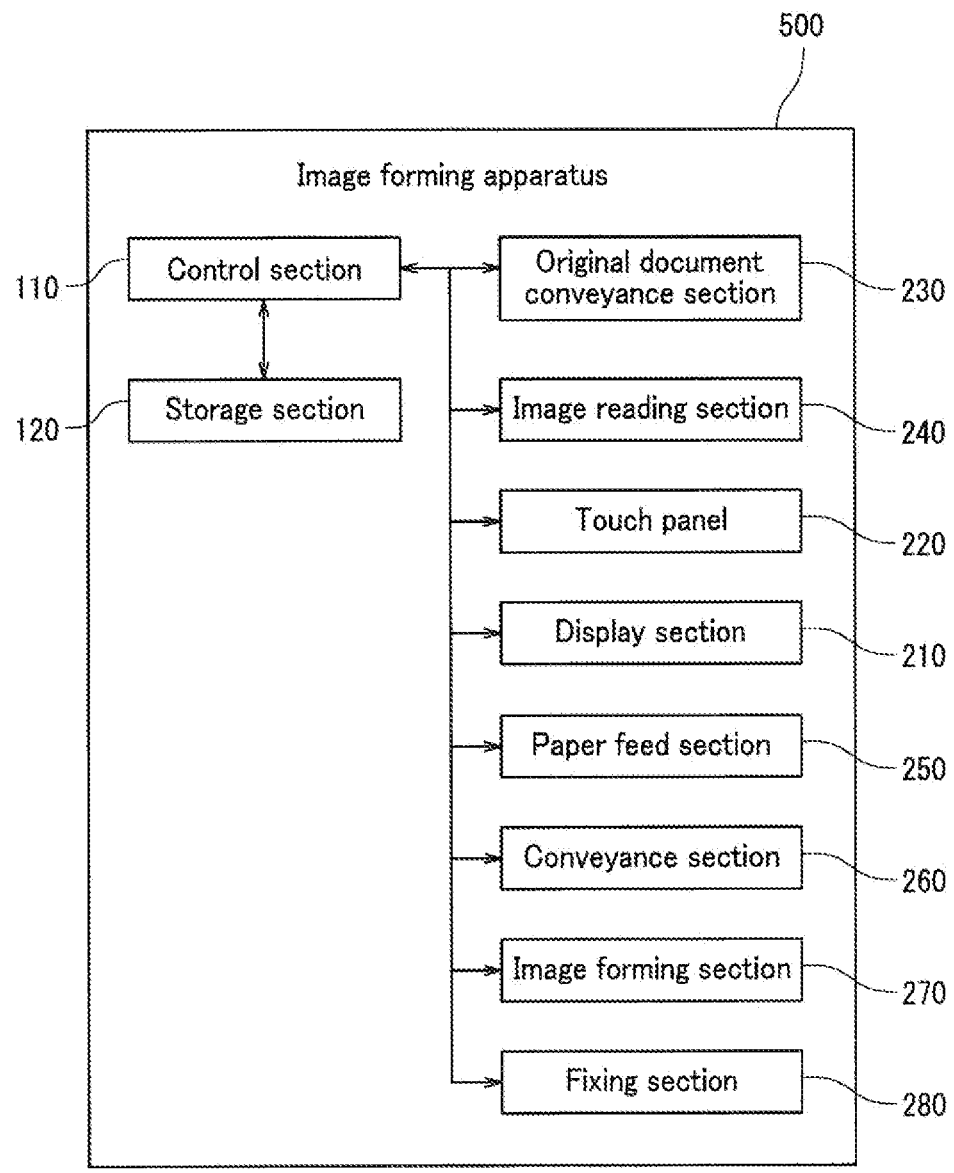
FIG. 7 is a block diagram schematically showing a configuration of an image forming apparatus according to the third embodiment of the present embodiment.
Figure 8:
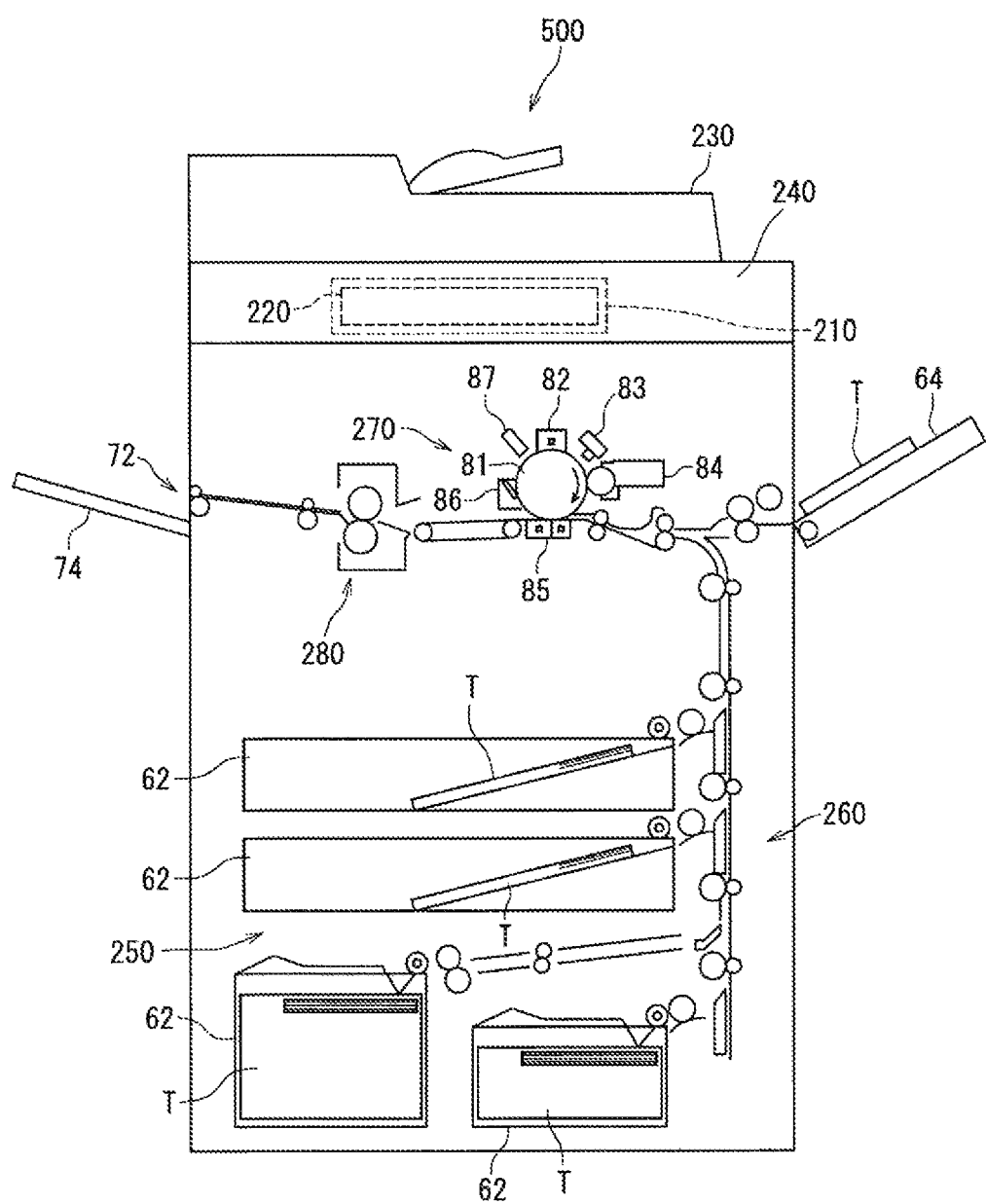
FIG. 8 is a schematic cross sectional view showing the configuration of the image forming apparatus according to the third embodiment of the present embodiment.

An image forming apparatus 500 according to the third embodiment of the present disclosure will be described with reference to FIGS. 7 and 8. FIG. 7 is a block diagram schematically showing a configuration of the image forming apparatus 500. FIG. 8 is a schematic cross sectional view for explaining the image forming apparatus 500.

The image forming apparatus 500 includes a control section 110, a storage section 120, an original document feed section 230, an image reading section 240, a touch panel 220, a display section 210, a paper feed section 250, a conveyance section 260, an image forming section 270, and a fixing section 280. The storage section 120 includes a main storage (e.g., semiconductor memory) and an auxiliary storage (e.g., semiconductor memory and/or hard disk drive).

The control section 110 controls the entire image forming apparatus 500. Specifically, the control section 110 executes a computer program stored in the storage section 120 to control the original document feed section 230, the image reading section 240, the touch panel 220, the display section 210, the paper feed section 250, the conveyance section 260, the image forming section 270, and the fixing section 280. The control section 110 may be a central processing unit (CPU), for example. The touch panel 220 may be arranged on the surface of the display section 210, for example.

The control section 110 functions as the display control section 100 in the first or second embodiment. Accordingly, the combination of the control section 110, the display section 210, and the touch panel 220 constitutes the display device 110 in the first or second embodiment. The storage section 120 stores image data of a plurality of pages P (e.g., an eBook, or a set of images).

The original document feed section 230 feeds an original document to the image reading section 240. The image reading section 240 reads an image of the original document to generate image data. The paper feed section 250 includes a paper feed cassette 62 and a manual feed tray 64. A sheet T is loaded on the paper feed cassette 62 or the manual feed tray 64. The sheet T is sent out from the paper feed cassette 62 or the manual feed tray 64 to the conveyance section 260. The sheet T may be plain paper, recycled paper, thin paper, thick paper, an overhead projector (OHP) sheet, or the like.

The conveyance section 260 conveys the sheet T to the image forming section 270. The image forming section 270 forms an image of a page PsR (or PsL) selected from the plurality of pages P on the sheet T. Alternatively, the image forming section 270 forms an image corresponding to the image data generated by the image reading section 240 on the sheet T. Specifically, the image forming section 270 forms (prints) the image on the sheet T in the following manner. The image forming section 270 includes a photosensitive drum 81, a charger 82, an exposure section 83, a development section 84, a transfer section 85, a cleaning section 86, and a static eliminating section 87.

The charger 82 electrostatically charges the surface of the photosensitive drum 81. The exposure section 83 irradiates the surface of the photosensitive drum 81 with light based on the image data generated by the image reading section 240. As a result, an electrostatic latent image corresponding to the image data is formed on the surface of the photosensitive drum 81.

The development section 84 develops the electrostatic latent image formed on the surface of the photosensitive drum 81 to form a toner image thereon. When the sheet T is supplied between the photosensitive drum 81 and the transfer section 85, the transfer section 85 transfers the toner image to the sheet T.

The sheet T to which the toner image is transferred is conveyed to the fixing section 280. The fixing section 280 applies heat and pressure to the sheet T to fix the toner image to the sheet T. Then, an ejection roller pair 72 ejects the sheet T onto an exit tray 74. The cleaning section 86 removes toner remaining on the surface of the photosensitive drum 81. The static eliminating section 87 removes residual charges on the surface of the photosensitive drum 81.

It should be note that the present disclosure is not limited to the above embodiments, and various alterations may be made without departing from the spirit and the scope of the present disclosure. For example, the first or second embodiments described with reference to FIGS. 2A, 2B, 4A, 4B, and 4C can be altered in the following manners.

(1) The touch point may travel across the edge lines EaR (or EaL) and EbR (or EbL). Alternatively, the touch point may travel across the edge line EbR (or EbL), starting from the inside of the front edge part 23R (or 23L).

(2) The direction from the start point to the end point of the touch point in the front edge part 23R may be the positive direction on the X axis. Also, the direction from the start point to the end point of the touch point in the front edge part 23L may be the negative direction on the X axis.

(3) The X component of the travel vector of the touch point is used as the amount of travel of the touch point in the above embodiments. Alternatively, the magnitude of the travel vector of the touch point may be used as the amount of travel of the touch point.

(4) The present disclosure is applicable to the fields of display devices to display a plurality of pages (e.g., an eBook or a set of images), and image forming apparatuses including such a display device.

What is claimed is:
1. A display device comprising:
a display section having a display surface;
a display control section configured to cause the display section to display a first display region and a first operating region; and
a detection section configured to detect a touch point in touch with the display surface of the display section,
wherein a page selected from a plurality of pages is displayed in the first display region,
the first operating region has a size corresponding to the number of pages from the page displayed in the first display region to an end page out of the pages,
the display control section updates the page displayed in the first display region to a page corresponding to a start point of the touch point and updates sequentially the page displayed in the first display region from the page corresponding to the start point of the touch point, through each subsequent page, to a page corresponding to an end point of the touch point according to a number of to-be-updated pages determined based on an amount of travel from the start point to the end point of the touch point within the first operating region and a number of to-be-updated pages per unit amount of travel of the touch point, in response to the detection section detecting the touch point in the first display region, the display control section does not update the page displayed in the first display region, the first operating region has an upper limit in the size, the size of the first operating region per unit page is constant, when movement of the touch point from a first edge line to a second edge line of the first operating region is repeated in a situation in which the number of pages from the page displayed in the first display region to an end page of the plurality of pages exceeds the number of pages corresponding to the upper limit, the display control section causes a page corresponding to the number of pages exceeding the number of pages corresponding to the upper limit to be displayed in the first display region, the first edge line is located adjacent to the first display region, and the first edge line is located opposite to the second edge line.

2. A display device according to claim 1, wherein the display control section causes the display section to display a second display region and a second operating region, the first and second display regions are arranged side by side between the first and second operating regions, a page subsequent to the page displayed in the first display region out of the pages is displayed in the second display region, the end page is a top page of the pages, the second operating region has a size corresponding to the number of pages from the page displayed in the second display region to a last page of the pages, and the display control section updates the pages displayed in the first and second display regions according to the number of to-be-updated pages determined based on the start point and the end point of the touch point within the first or second operating region.

3. A display device according to claim 2, wherein the display control section changes the sizes of the first and second operating regions according to update of the pages displayed in the first and second display regions.

4. A display device according to claim 2, wherein the first and second operating regions have upper limits in size, and a size per unit page in each of the first and second operating regions is fixed.

5. A display device according to claim 2, wherein each of the first and second display regions is fixed in size and position.

6. A display device according to claim 2, wherein when the display control section causes the display section to display the first operating region, a front edge part of an eBook is displayed in the first operating region having a first edge line, a second edge line, a third edge line, and a fourth edge line, the second edge line is one of a pair of edge lines of the first operating region that is located adjacent to the first display region, the first edge line is the other of the pair of edge lines of the first operating region that is located opposite to the second edge line, the third edge line is located between the first and second edge lines and extends from one of ends of the first edge line to one of ends of the second edge line, and the fourth edge line is located between the first and second edge lines and opposite to the third edge line and extends from the other end of the first edge line to the other end of the second edge line.

7. A display device according to claim 2, wherein the display control section consecutively updates the page displayed in the first display region from a page determined according to the start point.

8. A display device according to claim 1, wherein the display control section changes the size of the first operating region according to update of the page displayed in the first display region.

9. A display device according to claim 1, wherein the first operating region has an upper limit in size, and a size per unit page in the first operating region is fixed.

10. A display device according to claim 1, wherein the first display region is fixed in size and position.

11. A display device according to claim 1, wherein the display control section updates the page in a direction reverse to a direction from the start point to the end point of the touch point.

12. A display device according to claim 1, wherein upon the touch point detected by the detection section being located in the first operating region, the display control section specifies a page corresponding to the touch point corresponding to a length from the touch point to an edge line of the first operating region; and updates the page displayed in the first display region to the specified page, and the edge line of the first operating region is adjacent to the first display region.

13. A display device according to claim 1, wherein a gorge is displayed between the first and second display region, the display control section updates the page displayed in the first display region in a direction opposite to a direction from the start point to the end point of the touch point, and the direction from the start point to the end point is a direction away from the gorge.

14. A display device according to claim 1, wherein the display control section determines the number of to-be-updated pages according to the amount of travel from the start point to the end point of the touch point within the first operating region and the number of to-be-updated pages per unit amount of travel of the touch point.

15. A display device according to claim 1, wherein the display control section updates the page displayed in the first display region and the size of the first operating region while the detection section detects a touch point traveling in the first operating region.

16. A display device according to claim 1, wherein in a situation in which a first edge of the first operating region corresponds to a top page of the plurality of pages, the display control section calculates a page number of a page corresponding to the touch point by:

(page number of the page displayed in the first display region)×(length from the touch point to the first edge/length of the first operating region), and the first edge is an edge opposite to a second edge adjacent to the first display region among a pair of edges of the first operating region.

17. A display device according to claim 1, wherein in a situation in which a first edge of the first operating region corresponds to an end page of the plurality of pages, the display control section calculates a page number of a page corresponding to the touch point by:

(page number of the end page−page number of the page displayed in the first display region)×(length from the touch point to a second edge of the first operating region/length of the first operating region)+(page number of the page displayed in the first display region), the second edge is an edge adjacent to the first display region among a pair of edges of the first operating region, and the first edge is an edge opposite to the second edge among the pair of edges of the first operating region.

18. An image forming apparatus comprising:
a display device according to claim 1; and
an image forming section configured to form on a sheet an image of a page selected from the pages.

19. A display control method for causing a display section to display a display region that displays a page selected from a plurality of pages, comprising:
   causing the display section to display the display region and an operating region;
   determining a size of the operating region to be a size corresponding to the number of pages from the page displayed in the display region to an end page of the pages;
   obtaining information on a touch point in touch with a display surface of the display section;
   updating the page displayed in the display region to a page corresponding to a start point of the touch point; and
   sequentially updating the page displayed in the display region from the page corresponding to the start point of the touch point, through each subsequent page, to a page corresponding to an end point of the touch point according to a number of to-be-updated pages determined based on an amount of travel form the start point to the end point of the touch point within the operating region and a number of to-be-updated pages per unit amount of travel of the touch point, wherein the page displayed in the first display region is not updated when the touch point is present in the first display region, the operating region has an upper limit in the size, the size of the operating region per unit page is constant, when movement of the touch point from a first edge line to a second edge line of the operating region is repeated in a situation in which the number of pages from the page displayed in the first display region to an end page of the plurality of pages exceeds the number of pages corresponding to the upper limit, the display control section causes a page corresponding to the number of pages exceeding the number of pages corresponding to the upper limit to be displayed in the first display region, the first edge line is located adjacent to the first display region, and the first edge line is located opposite to the second edge line.

* * * * *